No. 851,606. PATENTED APR. 23, 1907.
M. NEIBURGER.
NUT LOCK.
APPLICATION FILED NOV. 24, 1905.
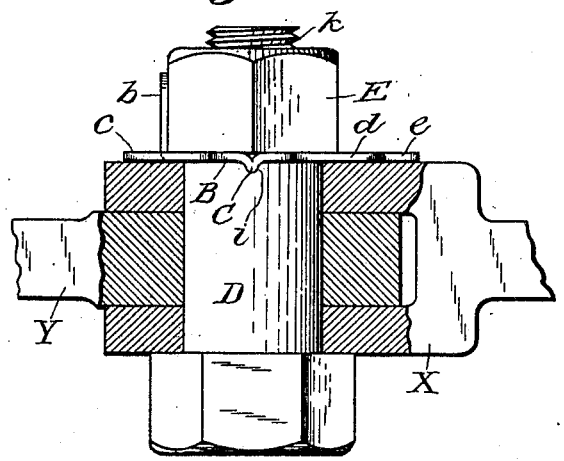
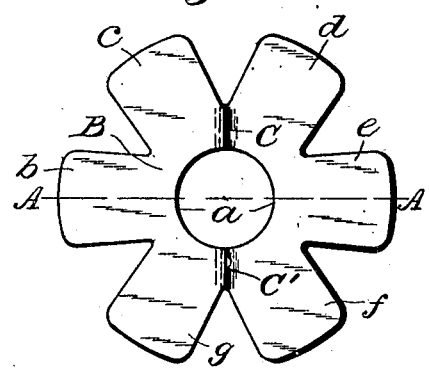
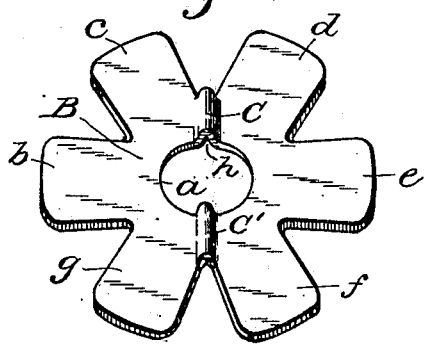
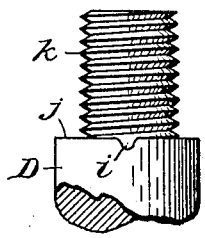
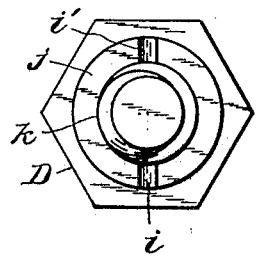
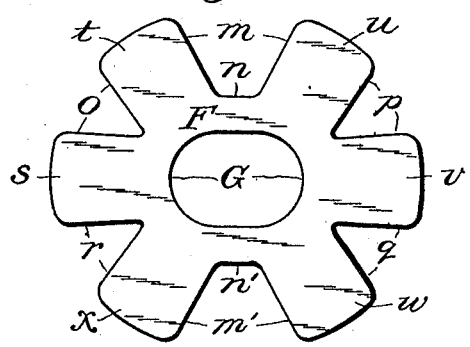
WITNESSES:
M. D. Beaty.
W. P. Morton.
INVENTOR:
Moses Neiburger,
BY
E. T. Silvius,
ATTORNEY.

UNITED STATES PATENT OFFICE.

MOSES NEIBURGER, OF LA FAYETTE, INDIANA.

NUT-LOCK.

No. 851,606.        Specification of Letters Patent.        Patented April 23, 1907.

Application filed November 24, 1905. Serial No. 288,827.

*To all whom it may concern:*

Be it known that I, MOSES NEIBURGER, a citizen of the United States, residing at La Fayette, in the county of Tippecanoe and State of Indiana, have invented new and useful Improvements in Nut-Locks; and I do declare the following to be a full, clear, and exact description of the invention, reference being had to the accompanying drawings, and to the letters and figures of reference marked thereon, which form a part of this specification.

This invention relates to devices that are employed for preventing nuts from becoming loose on screw-bolts, or for preventing the nuts from working off of the bolts when used in connection with moving machinery, vehicles or vibrating articles such as rail-joints, the invention having reference particularly to nut-locks of the washer type, and to bolts and other articles that are adapted to hold the washers to enable the washers to hold the nuts.

Objects of the invention are to provide nut-locks that will be neat in appearance and suitable for use on high-speed machines and those which may be well-finished; to provide nut-locks that may be adapted to be used in many situations, that may be cheaply produced and be durable and economical in use.

With the above mentioned and minor objects in view, the invention consists in a washer having projections at one side thereof for holding the washer, and having also fingers extending from the peripheral edge thereof adapted to be bent up to hold a nut, and a bolt or other element having recesses to receive the projections of the washer; and the invention consists further in the parts and combinations and arrangements of parts, as hereinafter particularly described and claimed.

Referring to the drawings, Figure 1 represents a side elevation of the improved nut-lock in connection with a knuckle-joint of mechanical apparatus; Fig. 2 a plan view of the washer and integral parts thereof; Fig. 3, a sectional view on the line A. A. in Fig. 2; Fig. 4, a perspective view of the washer and integral parts thereof, Fig. 5, a fragmentary side elevation of a bolt having the shoulder and recesses therein; Fig. 6, an end view of the bolt; and, Fig. 7, a plan of the blank from which the finished washer and projections thereof are formed.

Similar reference characters in the drawings designate corresponding elements or features.

In a practical embodiment of the invention, a washer B is provided, preferably composed of sheet steel, and it has a circular hole $a$ of suitable diameter to receive the threaded end of a bolt. The washer is provided with a pair of projections C and C' at either side of the hole that are formed integrally of the metal of the washer, the projections being at one side of the washer and designed to be placed in recesses to prevent rotation of the washer about a bolt. The washer has a number of integral fingers, preferably six, as $b$, $c$, $d$, $e$, $f$, $g$, that extend from the periphery thereof, each finger being broader near its extremity than at its base or part that is attached to the washer, and is adapted to be bent up against a flat side of a nut that may be seated on the washer. The side of the washer opposite to that having the projections has slight grooves $h$ extending into the projections which are each formed of two thicknesses of the metal sheet forming the washer.

Another part of the nut-lock comprises a bolt D having a pair of recesses $i$ and $i'$ at opposite sides thereof that are cut or pressed into a shoulder $j$ which is formed at the end of the body part of the bolt, there being a bolt-end extending beyond the shoulder that has screw-threads $k$ thereon, the washer being seated on the shoulder with the projections C and C' in the recesses $i$ and $i'$, and a nut E is placed on the threaded end of the bolt and is seated on the washer to hold the bolt in elements as X and Y, the bolt in such cases being adapted for use as a removable pivot, or for merely holding a number of elements together, as may be desired.

In order to produce the washer and integral parts thereof, a plate F is stamped out of a sheet of metal, and an oblong hole G is punched in the plate, the plate being oblong in plan, and in the longer edges thereof are two notches $m$ and $m'$ having straight bottoms $n$ and $n'$. In the shorter edges at either side of the major axis of the plate, are V-shape notches $o$, $p$, $q$, $r$, the parts of the plate between the notches thus being formed into segregated parts, $s$, $t$, $u$, $v$, $w$, $x$, of the whole. Suitable formers and dies are employed to strike up the projections C and C' from portions of the plate that comprise the longer sides thereof adjacent to the hole G, and press the two end portions of the plate together, so that the hole G becomes circular and forms the hole a of the washer, and the segregated parts become the fingers b, c, d, e, f, g.

In practical use, the washer B is to be placed on the threaded end of a bolt, with the projections C and C' entering the recesses i and i' that may have been prepared, either in the shoulder of the bolt or in an adjacent element, then a nut is to be screwed onto the bolt against the washer and stopped with a flat side of the nut opposite a finger of the washer, either one of the fingers being then turned up against a flat side of the nut to prevent the nut from unscrewing accidentally. To remove the nut, the finger may be again straightened, and when a finger breaks off from repeated bending, another finger may be used.

Having thus described the invention, what is claimed as new is—

1. A nut-lock including a bolt having a shoulder from which extends a screw-threaded end and provided with a pair of recesses in the shoulder adjacent to the screw-threaded end, a notched washer plate having parts thereof insertible in the recesses of the shoulder, and a nut to receive the threaded end and hold the parts of the washer plate in the recesses, said nut adapted to be locked by other parts of the washer plate.

2. A nut-lock comprising an element having a shoulder provided with two separate recesses, a threaded bolt-end having connection with the element and extending beyond the shoulder thereof, a notched washer plate engaging the shoulder and having portions thereof extending into the separate recesses, and a threaded nut on the threaded bolt-end and seated on the washer plate and engaged by a part thereof bent up against a side of the nut, said portions of the washer plate that extend into the recesses being two thicknesses of said plate looped and pressed together unsevered from the body of the plate.

3. A nut-lock including a bolt having a shoulder from which extends a screw-threaded end and provided with a pair of recesses in the shoulder adjacent to the screw-threaded end, in combination with a washer having a pair of projections insertible into the recesses of the shoulder and having also a plurality of fingers on the periphery of the washer.

4. A nut-lock washer formed of a blank comprising an oblong plate having an oblong hole therein and having notches in the periphery thereof, two of the notches being broader than the others, and the body of the washer being of uniform width between the hole and the bottoms or inner ends of the notches.

In testimony whereof, I affix my signature in presence of two witnesses.

MOSES NEIBURGER.

Witnesses:
GENE E. FORESMAN,
LENA TRIESCHMAN.